United States Patent

Donnelly

[11] Patent Number: 6,007,216
[45] Date of Patent: Dec. 28, 1999

[54] EMERGENCY ALERT LIGHT

[76] Inventor: John Donnelly, 1571 Grundy Ave., Holbrook, N.Y. 11741

[21] Appl. No.: 09/031,463

[22] Filed: Feb. 26, 1998

[51] Int. Cl.⁶ ..................................................... F21L 7/00
[52] U.S. Cl. ......................... 362/191; 362/197; 362/186; 362/263; 362/396; 362/398
[58] Field of Search ................................... 362/191, 197, 362/186, 263, 265, 398, 396

[56] References Cited

U.S. PATENT DOCUMENTS

| | | | |
|---|---|---|---|
| 3,818,439 | 6/1974 | Maine | 340/81 |
| 4,533,982 | 8/1985 | Kozar | 362/191 |
| 5,605,394 | 2/1997 | Chen | 362/197 |
| 5,707,137 | 1/1998 | Hon | 362/197 |
| 5,738,432 | 4/1998 | Okko et al. | 362/197 |

*Primary Examiner*—Nimeshkumar D. Patel
*Assistant Examiner*—Todd Reed Hopper

[57] ABSTRACT

An emergency flasher is provided including a housing having an inboard extent and an outboard extent rotatably coupled to the inboard extent. A flasher bulb is mounted on the outboard extent for intermittently illuminating upon the actuation thereof. Next included is a coupling assembly mounted on the housing for coupling the same to a recipient surface.

4 Claims, 2 Drawing Sheets

EMERGENCY ALERT LIGHT

BACKGROUND OF THE INVENTION

1. Field of the Invention

The present invention relates to flashlights and more particularly pertains to a new emergency alert light for signaling an emergency vehicle at a site of an emergency.

2. Description of the Prior Art

The use of flashlights is known in the prior art. More specifically, flashlights heretofore devised and utilized are known to consist basically of familiar, expected and obvious structural configurations, notwithstanding the myriad of designs encompassed by the crowded prior art which have been developed for the fulfillment of countless objectives and requirements.

Known prior art flashlights include U.S. Pat. Nos. 4,686,505; 4,328,481; 4,518,946; 4,959,637; U.S. Pat. No. Des. 274,561; and U.S. Pat. No. 5,280,270.

In these respects, the emergency alert light according to the present invention substantially departs from the conventional concepts and designs of the prior art, and in so doing provides an apparatus primarily developed for the purpose of signaling an emergency vehicle at a site of an emergency.

SUMMARY OF THE INVENTION

In view of the foregoing disadvantages inherent in the known types of flashlights now present in the prior art, the present invention provides a new emergency alert light construction wherein the same can be utilized for signaling an emergency vehicle at a site of an emergency.

The general purpose of the present invention, which will be described subsequently in greater detail, is to provide a new emergency alert light apparatus and method which has many of the advantages of the flashlights mentioned heretofore and many novel features that result in a new emergency alert light which is not anticipated, rendered obvious, suggested, or even implied by any of the prior art flashlights, either alone or in any combination thereof.

To attain this, the present invention generally comprises a housing having an inboard extent with a first length and a constant square cross-section along a length thereof. As shown in the Figures, the inboard extent includes four elongated side faces, an inboard face, and an outboard face. The outboard face has a pair of parallel planar arms coupled thereto and extended therefrom in alignment therewith for defining a fork. As shown in FIGS. 1 & 2, each of the arms has an arcuate outer edge with a plurality of spaced indents formed therein. The housing further includes an outboard extent with a second length which is less than ⅓ that of the inboard extent. The outboard extent further has a cross-section consistent with that of the inboard extent. The outboard extent is rotatably coupled between the arms of the fork. A detent is formed on the outboard extent for releasably engaging the indents of the fork. This permits the rotation of the outboard extent between a plurality of discrete orientations. An outboard face of the outboard extent of the housing has a removable tinted transparent cover screwably coupled thereto for housing a flasher bulb. Next provided is a coupling assembly including an elongated bracket having a rectangular bottom face and a pair of side faces coupled to side edges of the bottom face and extending therefrom in perpendicular relationship. A pair of inwardly extending lips are formed along top edges of the side faces for defining a T-shaped slot with a pair of open ends. Note FIGS. 1 & 2. The coupling assembly further includes a T-shaped protrusion coupled to the inboard face of inboard extent of the housing for being slidably secured within the T-shaped slot of the bracket. As such, the housing remains in perpendicular relationship with the elongated bracket. It should be noted that the bottom face of the elongated bracket has a plurality of countersunk bores formed therein for allowing the screwable coupling thereof to a recipient surface. Coupled to one of the elongated side faces of the inboard extent of the housing is a planar rectangular magnet for coupling the housing to a metallic recipient surface. Finally, an electrical assembly includes at least one battery situated within the inboard extent of the housing. A toggle switch is mounted on one of the elongated side faces of the inboard extent of the housing. The toggle switch is further electrically connected between the flasher bulb and the battery for allowing the selective actuation of the flasher bulb.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new emergency alert light apparatus and method which has many of the advantages of the flashlights mentioned heretofore and many novel features that result in a new emergency alert light which is not anticipated, rendered obvious, suggested, or even implied by any of the prior art flashlights, either alone or in any combination thereof.

It is another object of the present invention to provide a new emergency alert light which may be easily and efficiently manufactured and marketed.

It is a further object of the present invention to provide a new emergency alert light which is of a durable and reliable construction.

An even further object of the present invention is to provide a new emergency alert light which is susceptible of a low cost of manufacture with regard to both materials and labor, and which accordingly is then susceptible of low prices of sale to the consuming public, thereby making such emergency alert light economically available to the buying public.

Still yet another object of the present invention is to provide a new emergency alert light which provides in the apparatuses and methods of the prior art some of the advantages thereof, while simultaneously overcoming some of the disadvantages normally associated therewith.

Still another object of the present invention is to provide a new emergency alert light for signaling an emergency vehicle at a site of an emergency.

Even still another object of the present invention is to provide a new emergency alert light that includes a housing having an inboard extent and an outboard extent rotatably coupled to the inboard extent. A flasher bulb is mounted on the outboard extent for intermittently illuminating upon the actuation thereof. Next included is a coupling assembly mounted on the housing for coupling the same to a recipient surface.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
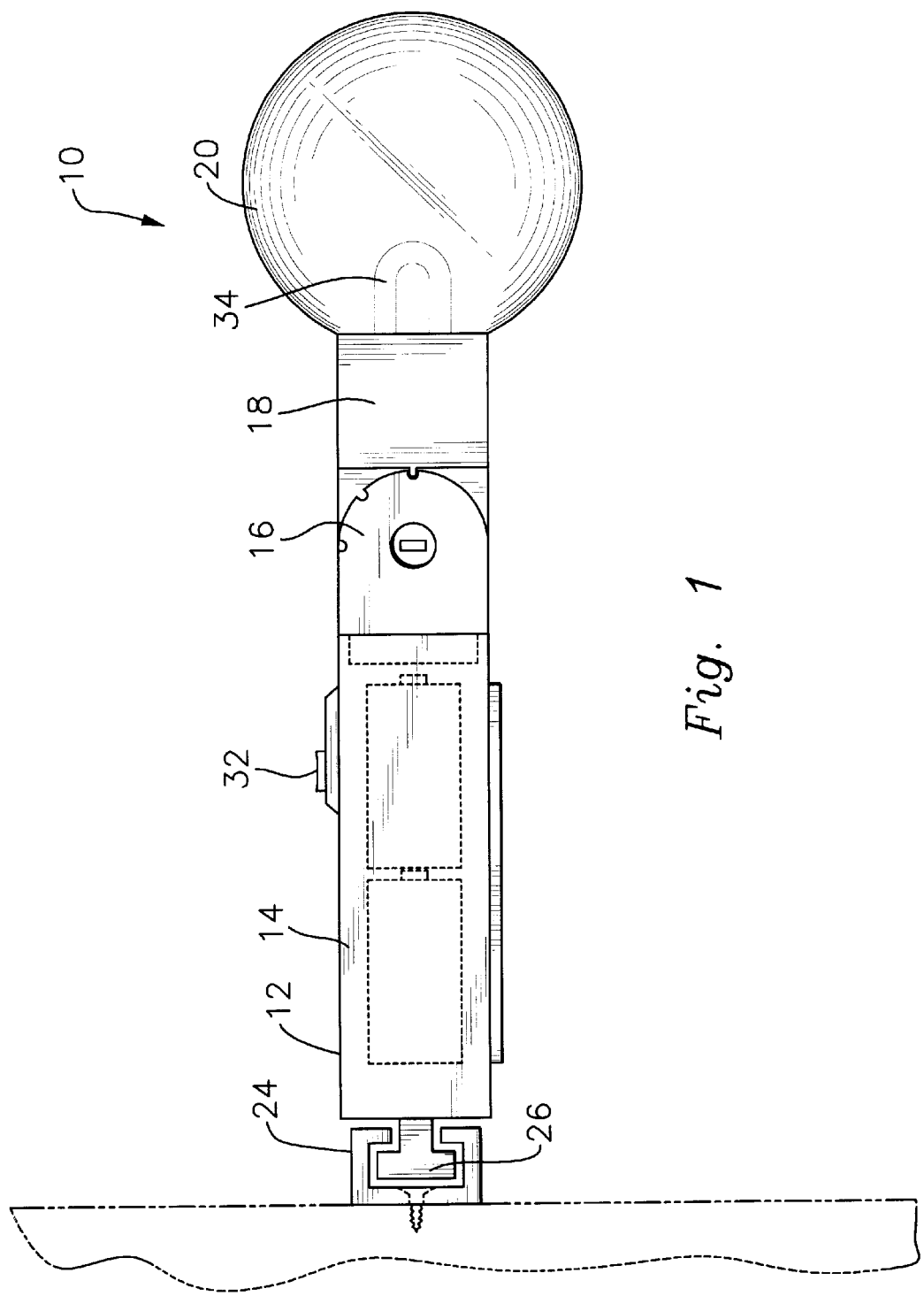
FIG. 1 is a side view of a new emergency alert light according to the present invention.
Figure 2:
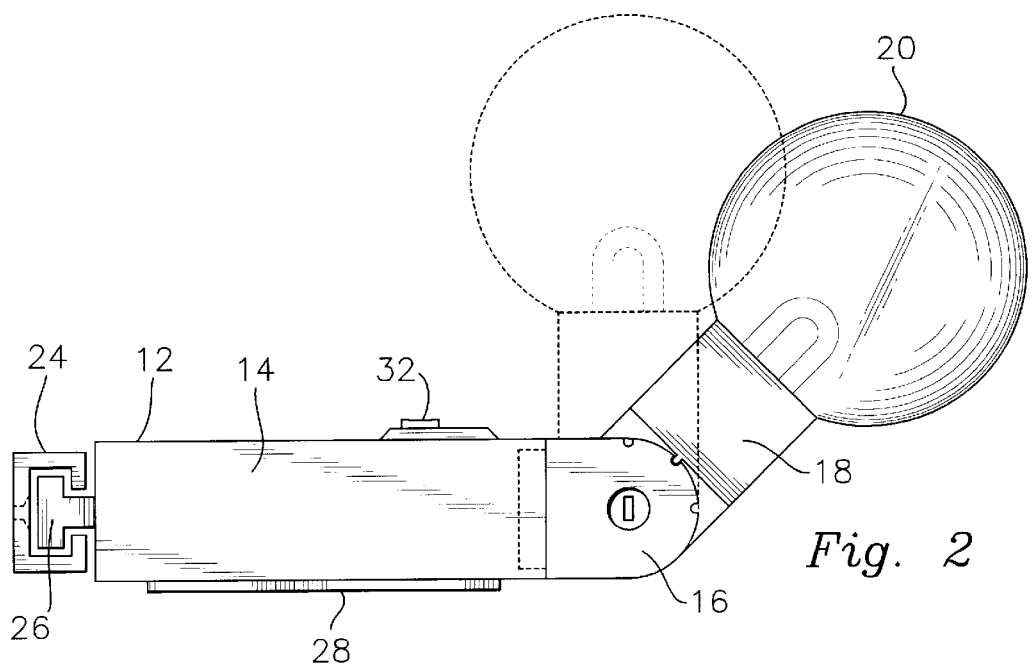
FIG. 2 is another side view of the present invention.
Figure 3:
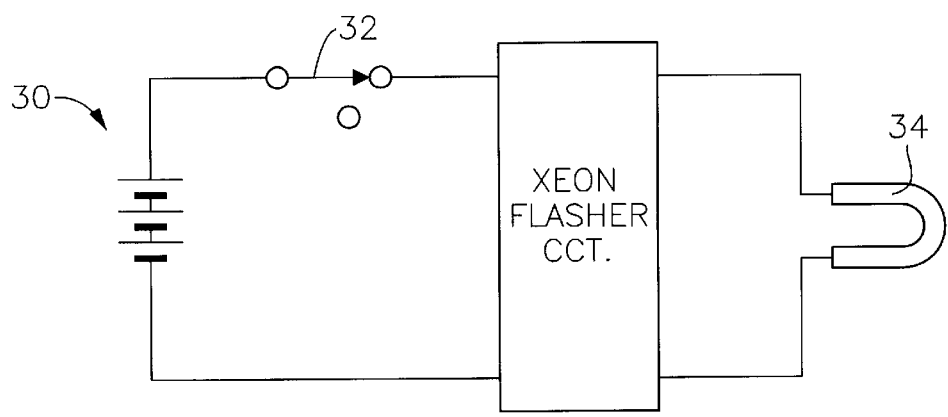
FIG. 3 is a schematic diagram of the present invention.

With reference now to the drawings, and in particular to FIGS. 1 through 3 thereof, a new emergency alert light embodying the principles and concepts of the present invention and generally designated by the reference numeral 10 will be described.

The present invention, designated as numeral 10, includes a housing 12 having an inboard extent 14 with a first length and a constant square cross-section along a length thereof. As shown in the Figures, the inboard extent includes four elongated side faces, an inboard face, and an outboard face. In an alternate embodiment, the housing may be constructed with a cylindrical configuration. The outboard face has a pair of parallel planar arms 16 coupled thereto and extended therefrom in alignment with a pair of side faces of the housing for defining a fork. As shown in FIGS. 1 & 2, each of the arms has an arcuate outer edge with a plurality of spaced indents formed therein.

The housing further includes an outboard extent 18 with a second length which is less than ⅓ that of the inboard extent. The outboard extent further has a cross-section consistent with that of the inboard extent. The outboard extent has a recessed portion that is rotatably coupled between the arms of the fork. A detent is formed on a ledge defined by the recessed portion of the outboard extent for releasably engaging the indents of the fork. The orientation of the indents permit the rotation of the outboard extent between a plurality of discrete orientations. Such orientations include a first orientation in axial alignment with the inboard extent and a second and third orientation forming a 45 and 90 degree angle with the inboard extent, respectively. An outboard face of the outboard extent of the housing has a removable blue-tinted transparent cover 20 screwably coupled thereto for housing a flasher bulb.

Next provided is a coupling assembly including an elongated bracket 24 having a rectangular bottom face and a pair of side faces coupled to side edges of the bottom face and extending therefrom in perpendicular relationship. A pair of inwardly extending lips are formed along top edges of the side faces for defining a T-shaped slot with a pair of open ends. Note FIGS. 1 & 2. Ideally, the bracket has a length of about 3 and ½ inches.

The coupling assembly further includes a T-shaped protrusion 26 coupled to the inboard face of inboard extent of the housing for being slidably secured within the T-shaped slot of the bracket. As such, the housing remains in perpendicular relationship with the elongated bracket. It should be noted that the bottom face of the elongated bracket has a plurality of countersunk bores formed therein for allowing the screwable coupling thereof to a recipient surface which preferably takes the form of a home or the like.

Coupled to one of the elongated side faces of the inboard extent of the housing is a planar rectangular magnet 28 for coupling the housing to a metallic recipient surface. In the preferred embodiment, the outboard extent is adapted to only rotate away from the side face which has the magnet mounted thereon. In alternate embodiments, other coupling mechanisms may be used such as suction cups.

Finally, an electrical assembly 30 includes at least one battery situated within the inboard extent of the housing. A toggle switch 32 is mounted on one of the elongated side faces of the inboard extent of the housing. The toggle switch is further electrically connected between the flasher bulb 34 and the battery for allowing the selective actuation of the flasher bulb. The bulb preferably takes the form of a Xeon flasher bulb with associated circuitry for illuminating the bulb intermittently at a high intensity.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An emergency flasher comprising:

a housing including an inboard extent having a first length and a constant square cross-section along a length thereof, the inboard extent including four elongated side faces, an inboard face, and an outboard face, the outboard face having a pair of parallel planar arms coupled thereto and extending therefrom in alignment therewith for defining a fork, each of the arms having an arcuate outer edge with a plurality of spaced indents formed therein, the housing further including an outboard extent with a second length which is less than ⅓ that of the inboard extent and a cross-section consistent with that of the inboard extent, the outboard extent being rotatably coupled between the arms of the fork and having a detent formed thereon for releasably engaging the indents of the fork thereby permitting the rotation of the outboard extent between a plurality of discrete orientations, wherein an outboard face of the outboard extent of the housing has a removable tinted transparent cover screwably coupled thereto for housing a flasher bulb;

a coupling assembly including an elongated bracket having a rectangular bottom face, a pair of side faces coupled to side edges of the bottom face and extending therefrom in perpendicular relationship and a pair of inwardly extending lips formed along top edges of the side faces for defining a T-shaped slot with a pair of open ends, the coupling assembly further including a T-shaped protrusion coupled to the inboard face of inboard extent of the housing for being slidably secured within the T-shaped slot of the bracket such that the housing remains in perpendicular relationship with the elongated bracket, wherein the bottom face of the elongated bracket has a plurality of countersunk bores formed therein for allowing the screwable coupling thereof to a recipient surface;

a planar rectangular magnet coupled to one of the elongated side faces of the inboard extent of the housing for coupling the housing to a metallic recipient surface; and an electrical assembly including at least one battery situated within the inboard extent of the housing and a toggle switch mounted on one of the elongated side faces of the inboard extent of the housing and further electrically connected between the flasher bulb and the battery for allowing the selective actuation of the flasher bulb.

2. An emergency flasher comprising:

a housing including an inboard extent and an outboard extent, the inboard extent being rotatably coupled to the outboard extent with two planar arms having a plurality of indents attached to the inboard extent, the outboard extent fitting between the two planar arms and having a plurality of detents for releasably engaging the indents of the forks, thereby allowing rotation of the outboard extent between a plurality of discrete orientations;

the outboard extent having a removable tinted transparent cover screwably coupled thereto for housing a flasher bulb;

a coupling assembly including an elongated bracket having an elongated T-shaped slot with open ends for securing to a surface, a T-shaped protrusion coupled to the inboard extent for being slidably secured within the T-shaped slot of the bracket;

a planar magnet coupled to a side face of the inboard extent for coupling the housing to a metallic surface; and an electrical assembly including a battery situated within the inboard extent, a switch mounted to a side face of the inboard extent and electrically connected between the flasher bulb and the battery.

3. The emergency flasher as set forth in claim 2 wherein the inboard extent has a length that is at least twice that of the outboard extent.

4. The emergency flasher as set forth in claim 2 wherein the bracket and housing remain in perpendicular relationship when coupled.

* * * * *